United States Patent
Kidambi

(10) Patent No.: US 9,602,307 B2
(45) Date of Patent: *Mar. 21, 2017

(54) TAGGING VIRTUAL OVERLAY PACKETS IN A VIRTUAL NETWORKING SYSTEM

(71) Applicant: INTERNATIONAL BUSINESS MACHINES CORPORATION, Armonk, NY (US)

(72) Inventor: Jayakrishna Kidambi, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/152,471

(22) Filed: May 11, 2016

(65) Prior Publication Data

US 2016/0254927 A1    Sep. 1, 2016

Related U.S. Application Data

(63) Continuation of application No. 13/831,215, filed on Mar. 14, 2013, now Pat. No. 9,374,241.

(51) Int. Cl.
*H04L 12/723* (2013.01)
*H04L 12/28* (2006.01)
(Continued)

(52) U.S. Cl.
CPC ........ *H04L 12/465* (2013.01); *H04L 12/4633* (2013.01); *H04L 45/64* (2013.01); *H04L 49/354* (2013.01)

(58) Field of Classification Search
CPC .......... H04L 49/354; H04L 2012/5621; H04L 12/5689; H04L 2012/562; H04L 12/4645–12/4666
See application file for complete search history.

(56) References Cited

U.S. PATENT DOCUMENTS 6,426,944 B1    7/2002   Moore
7,188,364 B2    3/2007   Volpano
(Continued)

FOREIGN PATENT DOCUMENTS

CN    1447538 A    10/2003
CN    1988544 A    6/2007
(Continued)

OTHER PUBLICATIONS

U.S. Notice of Allowance for U.S. Appl. No. 13/795,666 mailed May 20, 2016.
(Continued)

*Primary Examiner* — Hoon J Chung
(74) *Attorney, Agent, or Firm* — Sherman IP LLP; Kenneth L. Sherman; Hemavathy Perumal

(57) ABSTRACT

Embodiments of the invention provide a method for packet distribution in a virtual networking system comprising multiple virtual networks interconnected over an underlying layer network, wherein each virtual network comprises one or more computing nodes. The method comprises, for each virtual network, sending at least one outgoing packet targeting a computing node at a different virtual network, and receiving at least one incoming packet targeting a computing node of the virtual network. Each packet has a corresponding virtual networking tag that includes routing information identifying a destination virtual network for the packet.

20 Claims, 9 Drawing Sheets

(51) Int. Cl.
*H04L 12/46* (2006.01)
*H04L 12/931* (2013.01)
*H04L 12/715* (2013.01)

(56) References Cited

U.S. PATENT DOCUMENTS

| | | | |
|---|---|---|---|
| 7,424,019 | B1 | 9/2008 | Kopelman et al. |
| 7,478,173 | B1 | 1/2009 | Delco |
| 7,702,742 | B2 | 4/2010 | Tanaka et al. |
| 7,778,257 | B1 | 8/2010 | Bishara et al. |
| 7,885,276 | B1 | 2/2011 | Lin |
| 8,660,129 | B1 | 2/2014 | Brendel et al. |
| 8,665,706 | B2 | 3/2014 | Tan |
| 8,718,061 | B2 | 5/2014 | Chiueh et al. |
| 8,804,529 | B2 | 8/2014 | Bergamasco et al. |
| 8,892,706 | B1 | 11/2014 | Dalal |
| 2007/0064673 | A1 | 3/2007 | Bhandaru |
| 2009/0141729 | A1 | 6/2009 | Fan |
| 2009/0268614 | A1 | 10/2009 | Tay et al. |
| 2011/0051723 | A1 | 3/2011 | Rabie et al. |
| 2011/0141891 | A1 | 6/2011 | So |
| 2011/0283017 | A1 | 11/2011 | Alkhatib et al. |
| 2011/0299532 | A1 | 12/2011 | Yu et al. |
| 2011/0299537 | A1 | 12/2011 | Saraiya et al. |
| 2012/0063316 | A1 | 3/2012 | Ghanwani et al. |
| 2012/0093034 | A1 | 4/2012 | Kamath et al. |
| 2012/0173757 | A1 | 7/2012 | Sanden |
| 2012/0250682 | A1 | 10/2012 | Vincent et al. |
| 2012/0275328 | A1 | 11/2012 | Iwata et al. |
| 2012/0290703 | A1 | 11/2012 | Barabash et al. |
| 2013/0318219 | A1 | 11/2013 | Kancherla |
| 2014/0059111 | A1 | 2/2014 | Veeraiyan |
| 2014/0086253 | A1 | 3/2014 | Yong |
| 2014/0126418 | A1 | 5/2014 | Brendel et al. |
| 2014/0254603 | A1 | 9/2014 | Banavalikar et al. |
| 2014/0269321 | A1 | 9/2014 | Kamble et al. |
| 2014/0269709 | A1 | 9/2014 | Benny et al. |
| 2015/0281118 | A1 | 10/2015 | Banavalikar et al. |
| 2016/0234033 | A1 | 8/2016 | Banavalikar et al. |
| 2016/0241409 | A1* | 8/2016 | Ghanwani ............... H04L 49/70 |
| 2016/0323121 | A1 | 11/2016 | Benny et al. |

FOREIGN PATENT DOCUMENTS

| | | |
|---|---|---|
| CN | 101060454 A | 10/2007 |
| CN | 102549977 A | 7/2012 |
| CN | 102835080 A | 12/2012 |
| CN | 102857416 A | 1/2013 |
| CN | 102882710 A | 1/2013 |
| CN | 102946354 A | 2/2013 |
| KR | 100865722 B1 | 10/2008 |
| WO | 2006099296 A3 | 9/2006 |

OTHER PUBLICATIONS

U.S. Corrected Notice of Allowability for U.S. Appl. No. 14/689,915 mailed May 18, 2016.
Mell, P., et al., "The NIST Definition of Cloud Computing", National Institute of Standards and Technology Special Publication 800-145, Sep. 2011, pp. 1-7, U.S. Department of Commerce, United States.
International Search Report and Written Opinion dated Jun. 30, 2014 for International Application No. PCT/CN2014/073012 from State Intellectual Property Office of the P.R. China, pp. 1-10, Beijing, China.
Edwards, A. et al., "Diverter: A New Approach to Networking Within Virtualized Infrastructures", Proceedings of the First ACM Workshop on Research on Enterprise Networking (WREN '09), Aug. 2009, pp. 103-110, ACM, USA.
Birman, K.P., "Technology Challenges for Virtual Overlay Networks", IEEE Transactions on Systems, Man and Cybernetics, Part A: Systems and Humans, Jul. 2001, pp. 319-327, vol. 31, No. 4, IEEE, USA.
Recio, R., "Distributed Overlay Virtual Ethernet (DOVE) Networks", PowerPoint Presentation, 2012, Slides 1-27, IBM Corporation, USA.
International Search Report and Written Opinion dated Jun. 17, 2014 for International Application No. PCT/CN2014/073118 from State Intellectual Property Office of the P.R. China (ISA/CN), pp. 1-11, Beijing, China.
Iwata, A. et al., "Global Open Ethernet Architecture for a Cost-Effective Scalable VPN Solution", IEICE Transactions Communication, Jan. 2004, pp. 142-151, vol. E87-B, No. 1, Institute of Electronics, Information, and Communication, Japan.
Anonymous, "Intelligent MCs Debunk Perceptions", Communications News, Oct. 2004, pp. 2, 42, & 44, vol. 41, No. 10, Nelson Publishing, Inc., USA.
Cisco Corporation, "Routing Between VLANs Overview", Cisco IOS Switching Services Configuration Guide, 2010, pp. XC-302-XC-312, Cisco Corporation, USA.
Andersen, D.G., "Improving End-to-End Availability Using Overlay Networks", Doctoral Thesis in Computer Science and Engineering, Feb. 2005, pp. 1-150, Massachusetts Institute of Technology, USA.
Mao, Y. et al., "MOSAIC: Unified Platform for Dynamic Overlay Selection and Composition", University of Pennsylvania CIS Technical Report, pp. 1-14, University of Pennsylvania, USA.
Mao, Y. et al., "MOSAIC: Multiple Overlay Selection and Intelligent Composition", University of Pennsylvania CIS Technical Report, 2007, pp. 1-14, University of Pennsylvania, USA.
Patel, B.V. et al., "An Architecture and Implementation Toward Multiprotocol Mobility", IEEE Personal Communications, Jun. 1995, pp. 32-42, vol. 2, No. 3, IEEE, USA.
Anonymous, "IEEE Standards for Local and metropolitan area networks—Virtual Bridged Local Area Networks" IEEE Std 802.1Q, 2003 Edition, pp. 1-152, United States.
U.S. Non-Final Office Action for U.S. Appl. No. 13/840,492 mailed Jan. 5, 2015.
U.S. Notice of Allowance for U.S. Appl. No. 13/840,492 mailed Apr. 10, 2015.
U.S. Non-Final Office Action for U.S. Appl. No. 13/795,666 mailed Jan. 22, 2015.
U.S. Final Office Action for U.S. Appl. No. 13/795,666 mailed Jul. 17, 2015.
U.S. Advisory Action for U.S. Appl. No. 13/795,666 mailed Sep. 18, 2015.
U.S. Non-Final Office Action for U.S. Appl. No. 13/795,666 mailed Oct. 27, 2015.
U.S. Non-Final Office Action for U.S. Appl. No. 13/831,215 mailed Aug. 25, 2014.
U.S. Final Office Action for U.S. Appl. No. 13/831,215 mailed Dec. 9, 2014.
U.S. Notice of Allowance for U.S. Appl. No. 13/831,215 mailed Feb. 22, 2016.
U.S. Non-Final Office Action for U.S. Appl. No. 13/791,719 mailed Sep. 24, 2014.
U.S. Notice of Allowance for U.S. Appl. No. 13/791,719 mailed Feb. 17, 2015.
U.S. Corrected Notice of Allowability for U.S. Appl. No. 13/791,719 mailed Mar. 12, 2015.
U.S. Corrected Notice of Allowability for U.S. Appl. No. 13/791,719 mailed Apr. 29, 2015.
U.S. Notice of Allowance for U.S. Appl. No. 14/689,915 mailed Mar. 1, 2016.
U.S. Corrected Notice of Allowability for U.S. Appl. No. 14/689,915 mailed Mar. 25, 2016.
U.S. Non-Final Office Action for U.S. Appl. No. 15/132,092 mailed Oct. 5, 2016.

* cited by examiner

| TAG PROTOCOL ID (16 bits) | USER PRIORITY (3 bits) | CANONICAL FORMAT INDICATOR (1 bit) | VLAN ID (12 bits) | 802.1Q VLAN Tag |
| TAG PROTOCOL ID (16 bits) | USER PRIORITY (3 bits) | CANONICAL FORMAT INDICATOR (1 bit) | VNID (24 bits) | Virtual Networking Tag |
FIG. 9
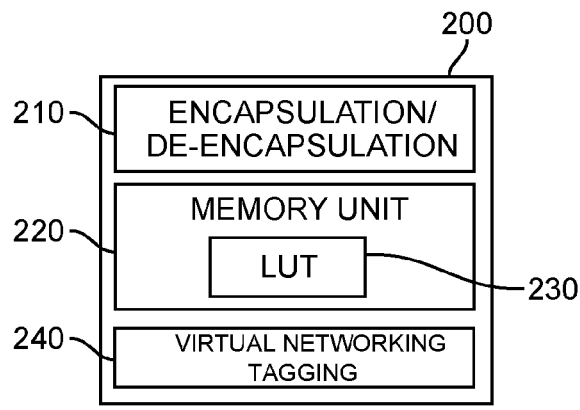
FIG. 10
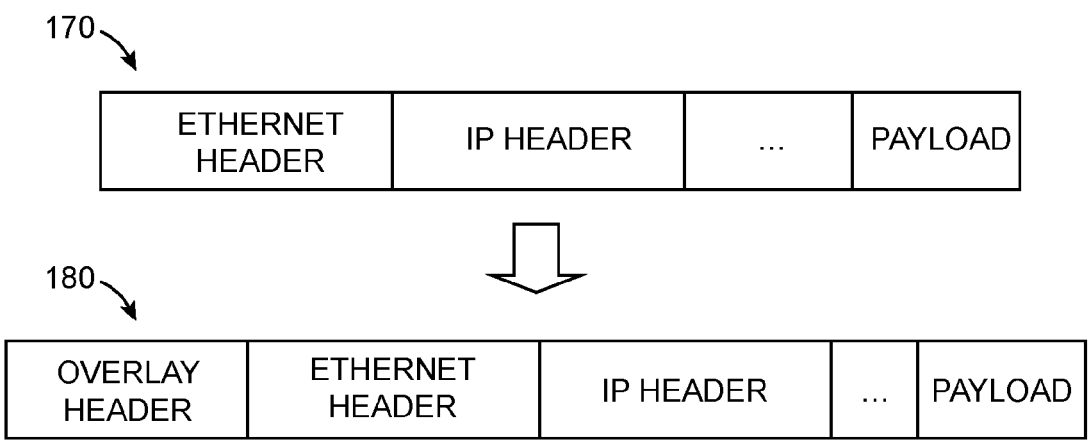
FIG. 11

TAGGING VIRTUAL OVERLAY PACKETS IN A VIRTUAL NETWORKING SYSTEM

BACKGROUND

Embodiments of the invention relate to overlay virtual environments, and in particular, tagging virtual overlay packets in a virtual networking system.

Network virtualization using overlays use encapsulation, such as virtual extensible local area network (VxLAN) encapsulation and network virtualization generic routing encapsulation (NVGRE), which may be supported by hypervisor and networking vendors. To use VxLAN or NVGRE encapsulation, hypervisor virtual switches are modified to support the respective overlay technology. Incompatibility with encapsulation types makes it necessary to use a translation gateway, which translates between the different packet formats. Often the translation gateways are communication bottlenecks and impact communication performance.

BRIEF SUMMARY

Embodiments of the invention provide a method for packet distribution in a virtual networking system comprising multiple virtual networks interconnected over an underlying layer network, wherein each virtual network comprises one or more computing nodes. The method comprises, for each virtual network, sending at least one outgoing packet targeting a computing node at a different virtual network, and receiving at least one incoming packet targeting a computing node of the virtual network. Each packet has a corresponding virtual networking tag that includes routing information identifying a destination virtual network for the packet.

Another embodiment provides a virtual networking system comprising multiple virtual networks, wherein each virtual network comprises one or more computing nodes. The system further comprises an underlying layer network interconnecting said multiple virtual networks. Each virtual network is configured to send at least one outgoing packet targeting a computing node at a different virtual network, and receive at least one incoming packet targeting a computing node of the virtual network. Each packet has a corresponding virtual networking tag that includes routing information identifying a destination virtual network for said packet.

These and other features, aspects and advantages of the present invention will become understood with reference to the following description, appended claims and accompanying figures.

BRIEF DESCRIPTION OF THE SEVERAL VIEWS OF THE DRAWINGS

FIG. 9 illustrates the difference between a standard 802.1Q VLAN tag and a virtual networking tag in accordance with an embodiment of the invention;

FIG. 10 is a block diagram of a tunnel end point (TEP) device in FIG. 5, in accordance with an embodiment of the invention;

FIG. 11 illustrates encapsulating an outgoing packet, in accordance with an embodiment of the invention;

DETAILED DESCRIPTION

Figure 1:
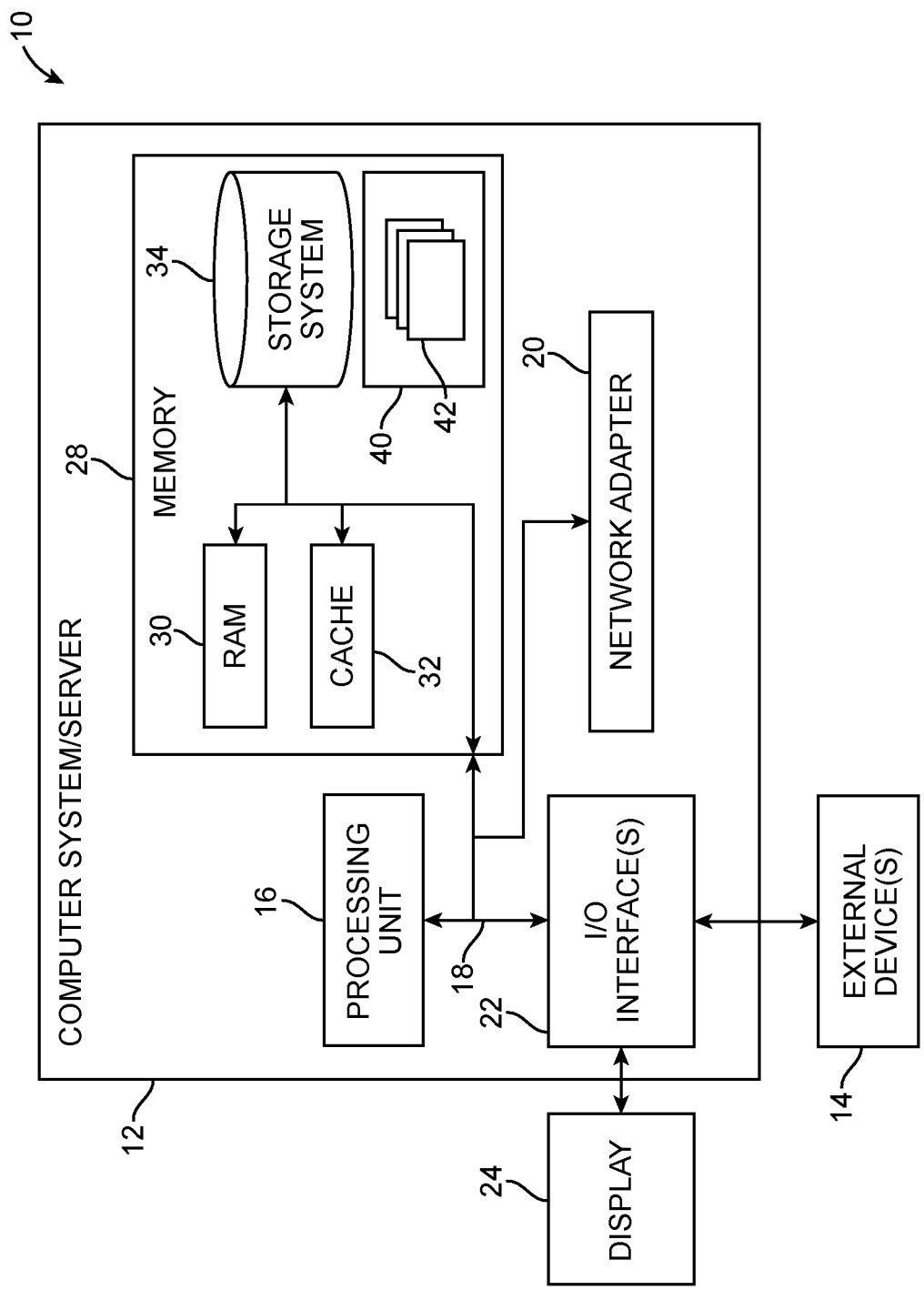
FIG. 1 illustrates a block diagram of an example cloud computing node, in accordance with an embodiment of the invention.

Embodiments of the invention relate to overlay virtual environments, and in particular, tagging virtual overlay packets in a virtual networking system. One embodiment provides a method for packet distribution in a virtual networking system comprising multiple virtual networks interconnected over an underlying layer network, wherein each virtual network comprises one or more computing nodes. The method comprises, for each virtual network, sending at least one outgoing packet targeting a computing node at a different virtual network, and receiving at least one incoming packet targeting a computing node of the virtual network. Each packet has a corresponding virtual networking tag that includes routing information identifying a destination virtual network for the packet.

Another embodiment provides a virtual networking system comprising multiple virtual networks, wherein each virtual network comprises one or more computing nodes. The system further comprises an underlying layer network interconnecting said multiple virtual networks. Each virtual network is configured to send at least one outgoing packet targeting a computing node at a different virtual network, and receive at least one incoming packet targeting a computing node of the virtual network. Each packet has a corresponding virtual networking tag that includes routing information identifying a destination virtual network for said packet.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 illustrates a block diagram of an example cloud computing node 10, in accordance with an embodiment of the invention. The cloud computing node 10 illustrated in FIG. 1 is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

The cloud computing node 10 comprises a computer system/server 12 that is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of the computer system/server 12 may include, but are not limited to, one or more processors or processing units 16, a system memory 28, and a bus 18 that couples various system components (e.g., the system memory 28 and the processor 16). The bus 18 represents one or more types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

A program/utility 40 including at least one program module 42 may be stored in the system memory 28 by way of example, and not limitation, as well as an operating system, one or more application programs, other program modules, and program data. Each of the operating systems, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, one or more devices that enable a consumer to interact with the computer system/server 12, and/or any devices (e.g., network card, modem, etc.) that enable the computer system/server 12 to communicate with one or more other computing devices. Such communication can occur via I/O interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
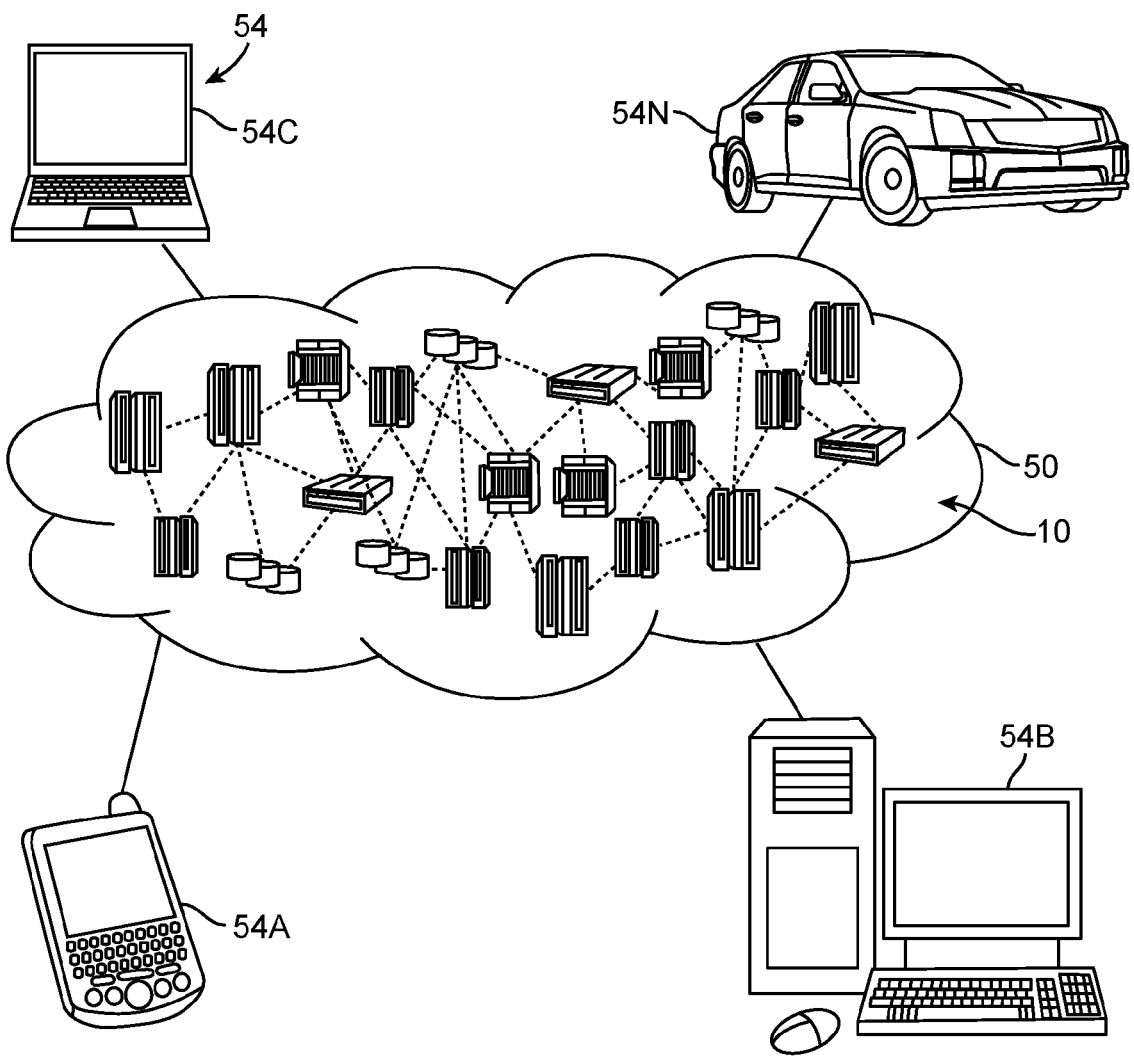
FIG. 2 illustrates an example cloud computing environment, in accordance with an embodiment of the invention.

FIG. 2 illustrates an example cloud computing environment 50, in accordance with an embodiment of the invention. Referring now to FIG. 2, illustrative cloud computing environment 50 is depicted. The cloud computing environment 50 comprises one or more cloud computing nodes 10 with which local computing devices 54 used by cloud consumers, such as, for example, a personal digital assistant (PDA) or a cellular telephone 54A, a desktop computer 54B, a laptop computer 54C, and/or an automobile computer system 54N may communicate. The nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
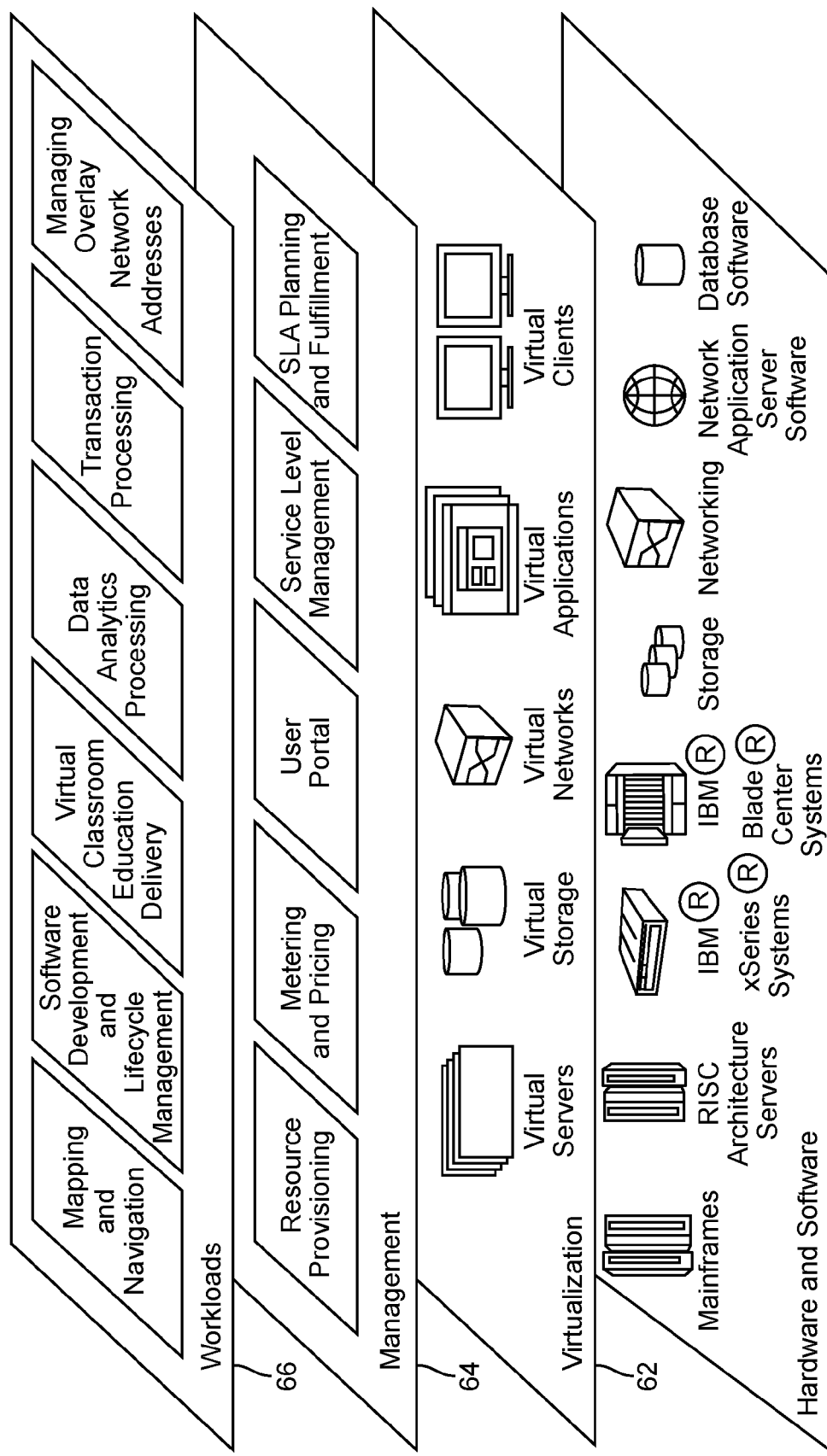
FIG. 3 illustrates abstraction model layers of a cloud computing environment, in accordance with an embodiment of the invention.

FIG. 3 illustrates abstraction model layers of a cloud computing environment 50, in accordance with an embodiment of the invention. Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and encapsulation mapping and communication. As mentioned above, all of the foregoing examples described with respect to FIG. 3 are illustrative only, and the invention is not limited to these examples.

It is understood all functions of the present invention as described herein can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing interoperability between hosts supporting multiple encapsulation. One embodiment includes a method that includes mapping packet encapsulation protocol type information for virtual switches. Each virtual switch is associated with one or more virtual machines (VMs). In one embodiment, it is determined whether one or more common encapsulation protocol types exist for a first VM associated with a first virtual switch and a second VM associated with a second virtual switch based on the mapping. In one embodiment, a common encapsulation protocol type is selected if it is determined that one or more common encapsulation protocol types exist for the first virtual switch and the second virtual switch. A packet is encapsulated for communication between the first VM and the second VM using the selected common encapsulation protocol type.

Figure 4:
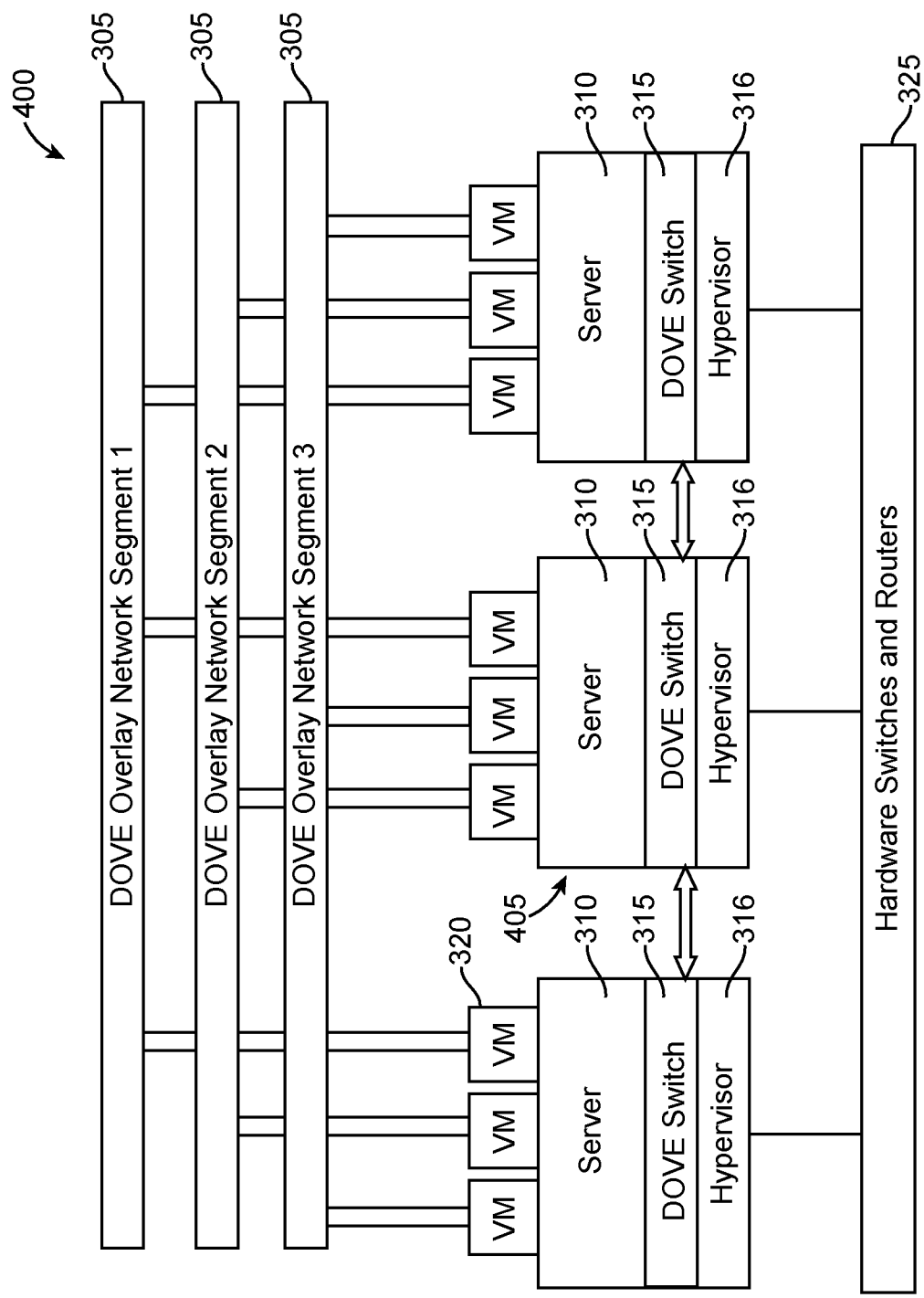
FIG. 4 shows a block diagram illustrating a distributed overlay virtual environment 400 for employing an embodiment of the present invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. The distributed overlay virtual environment 400 includes multiple virtual systems (or networks) 405 (also known as DOVE modules in one embodiment). Each virtual system 405 comprises a server 310 (or host) with a virtual switch 315, a hypervisor 316, and at least one VMs 320. The virtual system 405 overlays a physical layer 325 (e.g., including physical hardware and software processes) that may include physical switches, routers, servers, gateways, firewalls, etc. The physical layer 325 may also be referred to as the under layer.

In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where packets originating from one VM 320 are encapsulated (e.g., adding overlay and physical network headers) and the physical layer 325 (underlay) is used to deliver to a server 310 where the target VM 320 resides. In one embodiment, in the physical layer 325 an outer header is used by physical switches to forward packets, where an overlay identification (ID) in an encapsulation header provides traffic isolation. Incoming packets to a virtual switch 315 of a destination server 310 are de-capsulated (e.g., the encapsulation headers are stripped from the packet) and delivered to a destination VM 320. In one embodiment, address independence between different virtual systems 405 is supported. For example, two different VMs 320 operating in two different systems 405 may have the same Internet Protocol (IP) address and media access control (MAC) address. As another example, the systems 405 support deploying VMs 320, which belong to the same system 405, onto different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a distributed policy service (DPS)), and send the encapsulated data between systems 405 that, in turn, is de-capsulated and forwarded to a destination VM 320. In one embodiment, the policies describe, in a logical manner, how data is required to be sent over virtual networks without details of the underlying physical entities that performs particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical network interface card (NIC) may be abstracted as a virtual NIC (vNIC) of a system 405. In one embodiment, a virtual switch 315 is a software abstraction of an Ethernet switch in the hypervisor 316 for providing connectivity for VMs 320.

Figure 5:
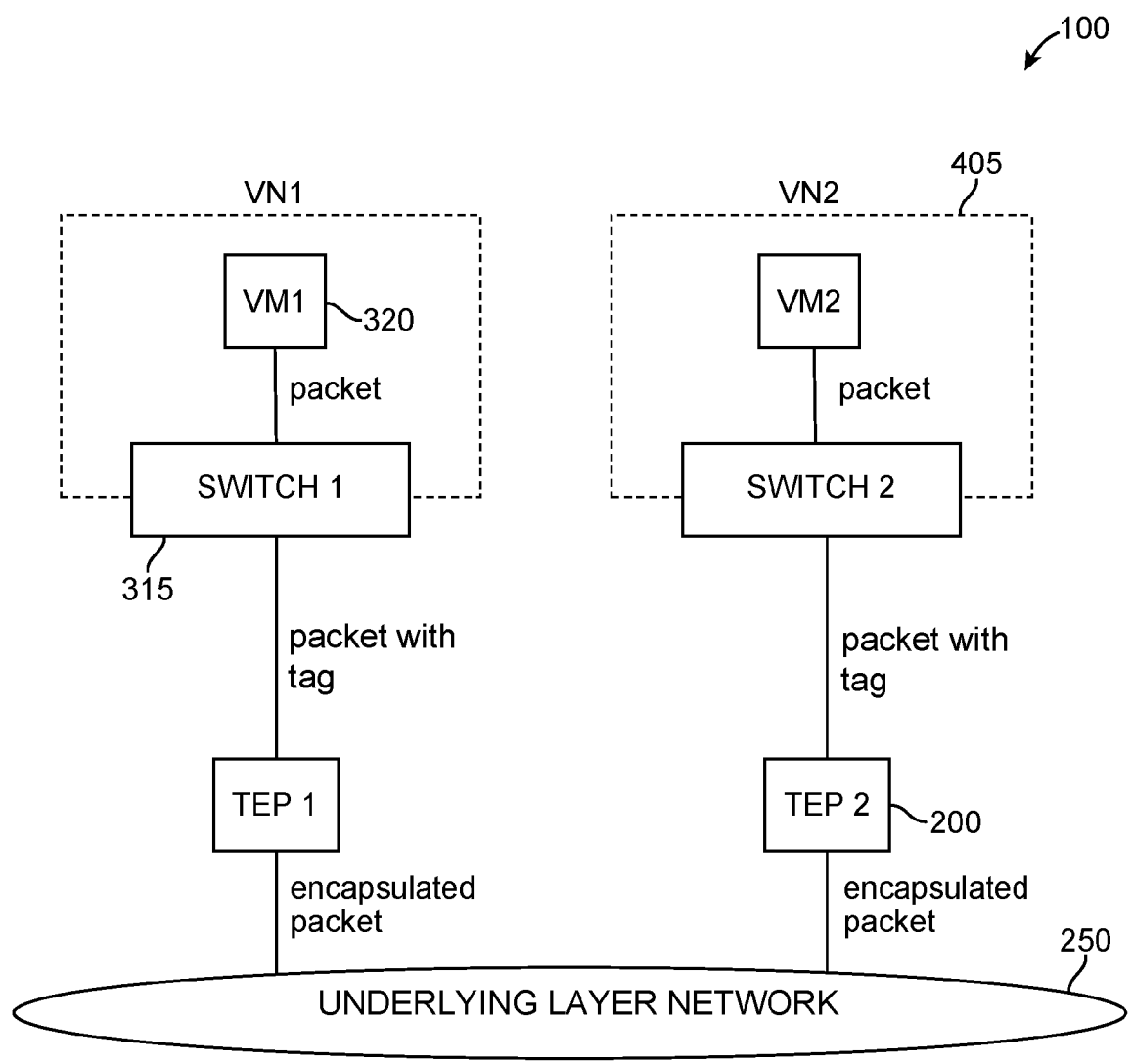
FIG. 5 illustrates packet distribution in a virtual networking system 100, in accordance with an embodiment of the invention.

FIG. 5 illustrates packet distribution in a virtual networking system 100, in accordance with an embodiment of the invention. The system 100 comprises multiple virtual networks (systems) 405, such as a first virtual network VN1 and a second virtual network VN2. Each virtual network 405 comprises at least one server (host) 310 (FIG. 4) on which a hypervisor 316 (FIG. 4) is running. The hypervisor 316 creates and runs one or more virtual machines 320. For example, as shown in FIG. 5, the first virtual network VN1 comprises a virtual machine 320 identified as VM1, the second virtual network VN2 comprises a virtual machine 320 identified as VM2.

Each virtual machine 320 of a virtual network 405 may receive an incoming packet from, and/or send an outgoing packet to, another virtual machine 320. In one embodiment, tunnel end point (TEP) devices 200 are utilized to facilitate packet distribution between different virtual networks 405 via an underlying layer network 250 (e.g., a Layer 2 network or a Layer 3 network such an IP network). Specifically, each virtual network 405 is connected to a corresponding tunnel end point (TEP) device 200. For example, as shown in FIG. 5, the first virtual network VN1 is connected to a corresponding TEP device 200 identified as TEP 1, and the second virtual network VN2 is connected to a corresponding TEP device 200 identified as TEP 2.

Each virtual network 405 comprises at least one DOVE switch 315 for processing incoming packets and outgoing packets. For example, as shown in FIG. 5, the first virtual network VN1 further comprises a DOVE switch 315 identified as SWITCH 1, and the second virtual network VN2 further comprises a DOVE switch 315 identified as SWITCH 2. Virtual machine VM1 of the first virtual network VN1 is connected to SWITCH 1, and virtual machine VM2 of the second virtual network VN2 is connected to SWITCH 2.

As described in detail later herein, a DOVE switch 315 of a virtual network 405 is configured to receive an outgoing packet from a virtual machine 320 of the virtual network 405. The DOVE switch 315 tags the outgoing packet with a corresponding virtual networking tag. The DOVE switch 315 sends the outgoing packet with the virtual networking tag to a corresponding TEP device 200 of the virtual network 405.

As described in detail later herein, a TEP device 200 for a virtual network 405 is configured to encapsulate an outgoing packet from the virtual network 405 before sending the outgoing packet to another TEP device 200 via the underlying layer network 250. The TEP device 200 encapsulates the outgoing packet based on a corresponding virtual networking tag, and sends the encapsulated outgoing packet to another TEP device 200 via the underlying layer network 250. The underlying layer network 250 propagates encapsulated packets between different TEP devices 200.

As described in detail later herein, a TEP device 200 for a virtual network 405 is further configured to de-encapsulate an encapsulated incoming packet received from another TEP device 200 via the underlying layer network 250. The TEP device 200 is further configured to tag the incoming packet with a corresponding virtual networking tag, and send the incoming packet with the virtual networking tag to the virtual network 405.

As described in detail later herein, a DOVE switch 315 of a virtual network 405 is further configured to receive an incoming packet from a corresponding TEP device 200 of the virtual network 405. Upon receiving the incoming packet, the DOVE switch 315 determines which virtual machine 320 the incoming packet targets based on a corresponding virtual networking tag, and sends the incoming packet to the target virtual machine 320.

Figure 6:
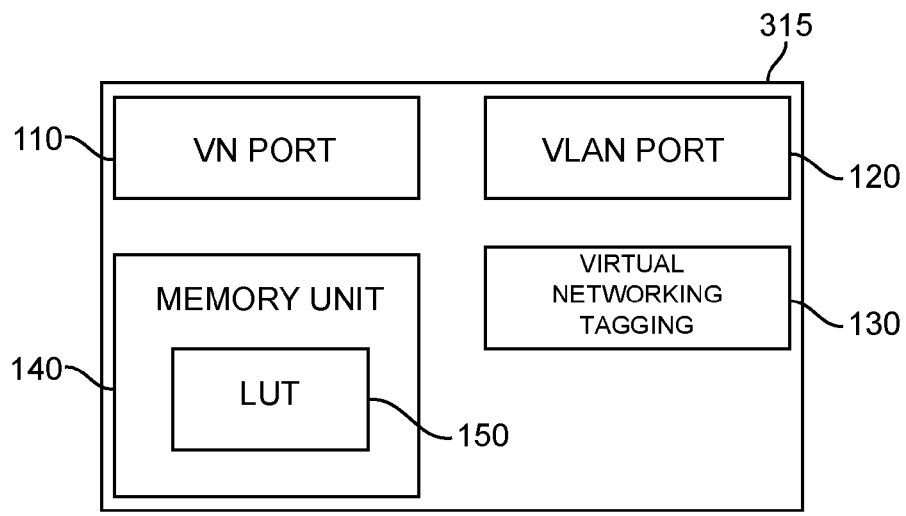
FIG. 6 is a block diagram of a distributed overlay virtual Ethernet (DOVE) switch in FIG. 5, in accordance with an embodiment of the invention.

FIG. 6 is a block diagram of a DOVE switch 315 in FIG. 5, in accordance with an embodiment of the invention. A DOVE switch 315 of a virtual network 405 comprises at least the following components: a virtual network port 110 (VN PORT) for receiving outgoing packets from a virtual machine 320 of the virtual network 405, a VLAN port 120 (VLAN PORT) for receiving incoming packets from a corresponding TEP device 200 of the virtual network 405, a virtual networking tagging application module 130 for processing incoming packets and outgoing packets, and a memory unit 140.

When the DOVE switch 315 receives a packet, the packet will either already have a virtual networking tag or the DOVE switch 315 will insert a virtual networking tag into the packet. For example, an incoming packet originating from a different virtual network 405 includes a virtual networking tag, whereas an outgoing packet from a virtual machine 320 of the virtual network 405 does not include a virtual networking tag (i.e., the DOVE switch 315 will insert a virtual networking tag into the outgoing packet).

Each DOVE switch 315 and each port is associated with a virtual network identifier (VNID) representing a virtual network 405. In one embodiment, the memory unit 140 maintains a lookup table 150 (LUT). The lookup table 150 includes information mapping each DOVE switch 315 and each port to a corresponding 24-bit VNID. In one embodiment, a management plane command associates a VNID with a switch/port.

Upon receiving an outgoing packet, the virtual networking tagging application module 130 determines a VNID for the virtual network 405 that the outgoing packet belongs to based on the lookup table 150 and header information included in the outgoing packet. The virtual networking tagging application module 130 tags the outgoing packet with a corresponding virtual networking tag, wherein the virtual networking tag includes the VNID. The virtual networking tagging application module 130 sends the outgoing packet with the virtual networking tag to a corresponding TEP device 200 of the virtual network 405.

Upon receiving an incoming packet, the virtual networking tagging application module 130 determines a virtual machine 320 that the incoming packet targets based on the lookup table 150, a virtual networking tag included in the incoming packet, and header information included in the incoming packet. The virtual networking tagging application module 130 then forwards the incoming packet to the target virtual machine 320.

Figure 7:
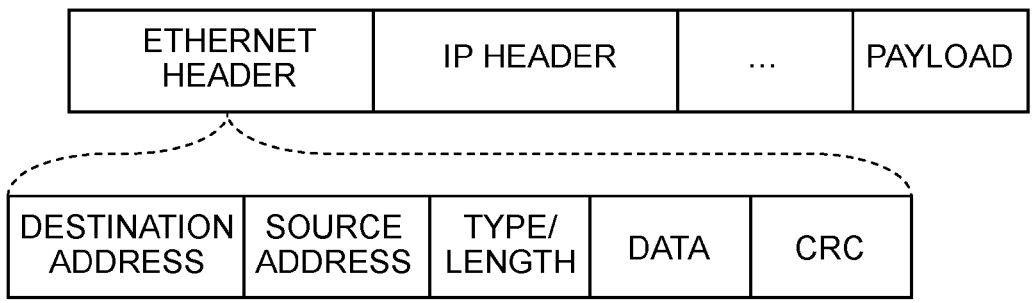
FIG. 7 illustrates an example untagged packet, in accordance with an embodiment of the invention.

FIG. 7 illustrates an example untagged packet 160, in accordance with an embodiment of the invention. The untagged packet 160 comprises payload information and supplemental data positioned before the payload information, such as an Ethernet header and an IP header. The untagged packet 160 may include additional supplemental data.

The Ethernet header comprises at least the following information: a destination address (i.e., the address of a virtual machine 320 that the packet is sent/broadcast to), a source address (i.e., the address of a virtual machine 320 that generated the packet), type/length information relating to data that the packet is carrying, the data that the packet is carrying, and cyclic redundancy check (CRC) information.

Figure 8:
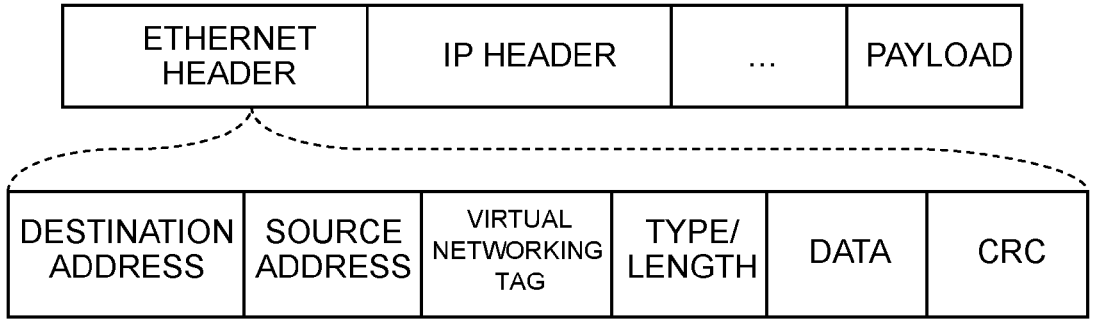
FIG. 8 illustrates an example tagged packet, in accordance with an embodiment of the invention.

FIG. 8 illustrates an example tagged packet 170, in accordance with an embodiment of the invention. Upon receiving an outgoing packet in the form of an untagged packet 160 from a virtual machine 320, the virtual networking tagging application module 130 transforms the outgoing packet into a tagged packet 170 by inserting a virtual networking tag into the Ethernet header of the outgoing packet.

In one embodiment, the virtual networking tag comprises 44 bits, which includes a 24-bit VNID of the virtual network 405 that the outgoing packet belongs to. The virtual networking tagging application module 130 sends the tagged packet 170 to a corresponding TEP device 200.

The virtual networking tagging application module 130 also receives tagged packets 170 from the corresponding TEP device 120. Each tagged packet 170 the virtual networking tagging application module 130 receives represents an incoming packet. Upon receiving a tagged packet 170, the virtual networking tagging application module 130 determines a target virtual machine 320 based on the lookup table 150, header information included in the tagged packet 170, and the virtual networking tag included in the tagged packet 170. The virtual networking tagging application module 170 transforms the tagged packet 170 to an untagged packet 160, and sends the untagged packet 160 to the target virtual machine 320.

FIG. 9 illustrates the difference between a standard 802.1Q VLAN tag and a virtual networking tag in accordance with an embodiment of the invention. A standard 802.1Q VLAN tag comprises 32 bits of information. The information included in the standard 802.1Q VLAN tag is the following: 16 bits for a tag protocol identifier, 3 bits for indicating user priority, 1 bit for a canonical format indicator, and 12 bits for a VLAN identifier identifying a target virtual network 405.

In one embodiment, the virtual networking tag comprises a 24-bit VNID and a new tag protocol identifier indicating the presence of the 24-bit VNID.

In one embodiment, the virtual networking tag is an extended 802.1Q VLAN tag. Compared to the standard 802.1Q VLAN tag, the extended 802.1Q VLAN tag comprises 44 bits of information. The extended 802.1Q VLAN tag includes a tag protocol identifier indicating the presence of a 24-bit VNID instead of a 12-bit VLAN identifier, and the 24-bit VNID.

FIG. 10 is a block diagram of a TEP device 200 in FIG. 5, in accordance with an embodiment of the invention. The TEP device 200 comprises at least the following components: an encapsulation/de-encapsulation application module 210 for encapsulating outgoing packets and de-encapsulating incoming packets, a memory unit 220, and a virtual networking tagging application module 240 for tagging each incoming packet with a corresponding virtual networking tag.

In one embodiment, the memory unit 220 maintains a lookup table 230 (LUT). The lookup table 230 includes information mapping each DOVE switch 315 and each port to a corresponding 24-bit VNID.

Upon receiving an outgoing packet from a DOVE switch 315, the encapsulation/de-encapsulation application module 210 encapsulates the outgoing packet with an overlay header based on a corresponding virtual networking tag. The encapsulation/de-encapsulation application module 210 sends the encapsulated outgoing packet to another TEP device 200 via the underlying layer network 250, wherein the other TEP device 200 is the corresponding TEP device 200 for the target virtual network 405.

Upon receiving an incoming packet from another TEP device 200 via the underlying layer network 250, the encapsulation/de-encapsulation application module 200 de-encapsulates the incoming packet by removing an overlay header included in the incoming packet. The virtual networking tagging application module 240 then tags the incoming packet with a virtual networking tag based on the lookup table 230 and remaining header information in the incoming packet. The virtual networking tagging application module 240 forwards the tagged incoming packet to a DOVE switch 315 of the target virtual network 405.

FIG. 11 illustrates encapsulating an outgoing packet, in accordance with an embodiment of the invention. Upon receiving a tagged packet 170 representing an outgoing packet from a DOVE switch 315, the encapsulation/de-encapsulation application module 210 encapsulates the packet 170 with an overlay header (i.e., outer header). The encapsulation/de-encapsulation application module 210 sends the encapsulated packet 180 to another TEP device 200 via the underlying layer network 250.

In one embodiment, an overlay header (i.e., outer header) of a packet includes addresses specific to the underlying layer network 250, and an inner header (i.e., the headers/frames of the packet 170 before encapsulation) includes addresses specific to a virtual network 405 that the packet belongs to.

Figure 12:
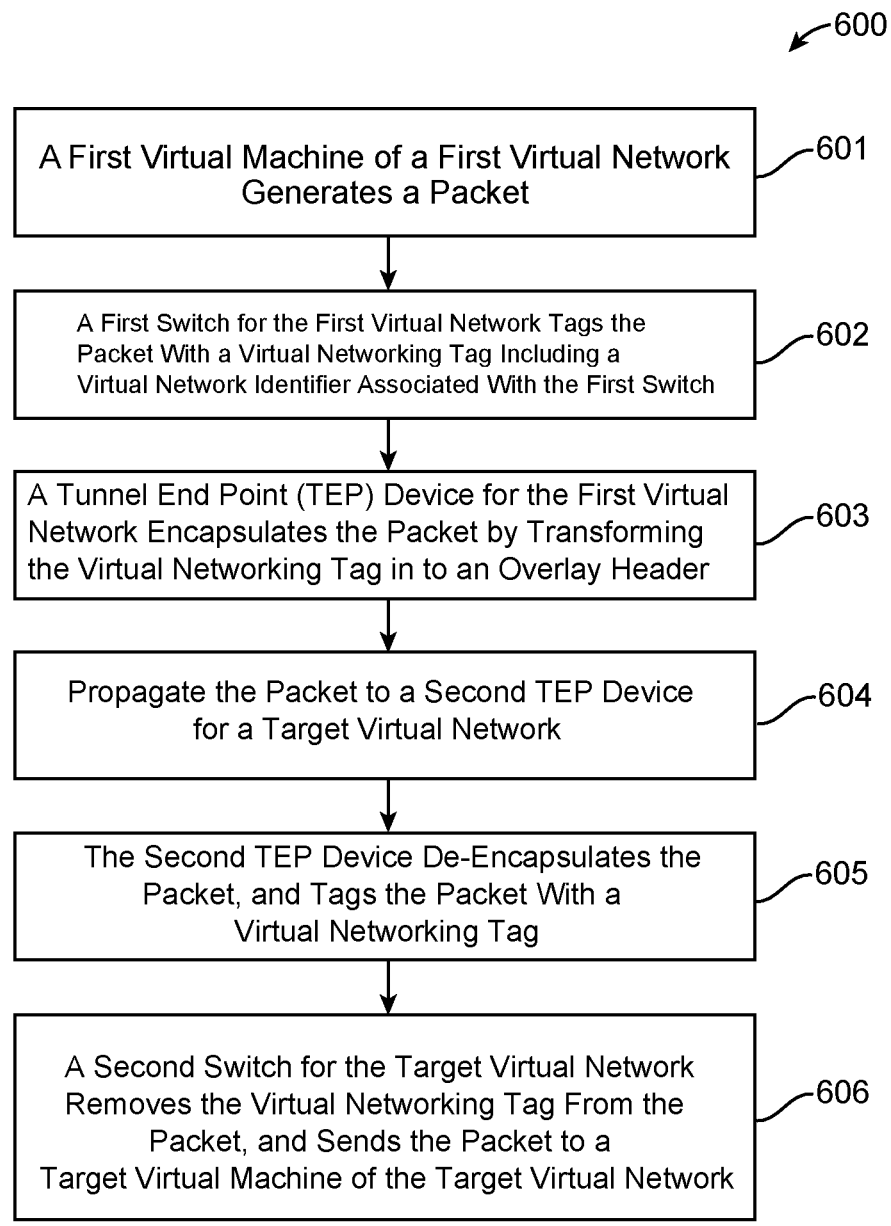
FIG. 12 illustrates a flowchart of an example process of packet distribution for a virtual networking system, in accordance with an embodiment of the invention.

FIG. 12 illustrates a flowchart of an example process 600 of packet distribution for a virtual networking system, in accordance with an embodiment of the invention. In process block 601, a first virtual machine of a first virtual network generates a packet. In process block 602, a first switch for the first virtual network tags the packet with a virtual networking tag including a virtual networking identifier (VNID) associated with the first switch (e.g., a management plane command associates the VNID with the first switch). In process block 603, a first TEP device for the virtual network encapsulates the packet by transforming the virtual networking tag into an overlay header. In process block 604, the packet propagates to a second TEP device for a target virtual network (via an underlying layer network, for example a Layer 2 network or a Layer 3 network such an IP network). In process block 605, the second TEP device de-encapsulates the packet, and tags the packet with a virtual networking tag. In process block 606, a second switch for the target virtual network removes the virtual networking tag from the packet, and sends the packet to a target virtual machine of the target virtual network.

Figure 13:
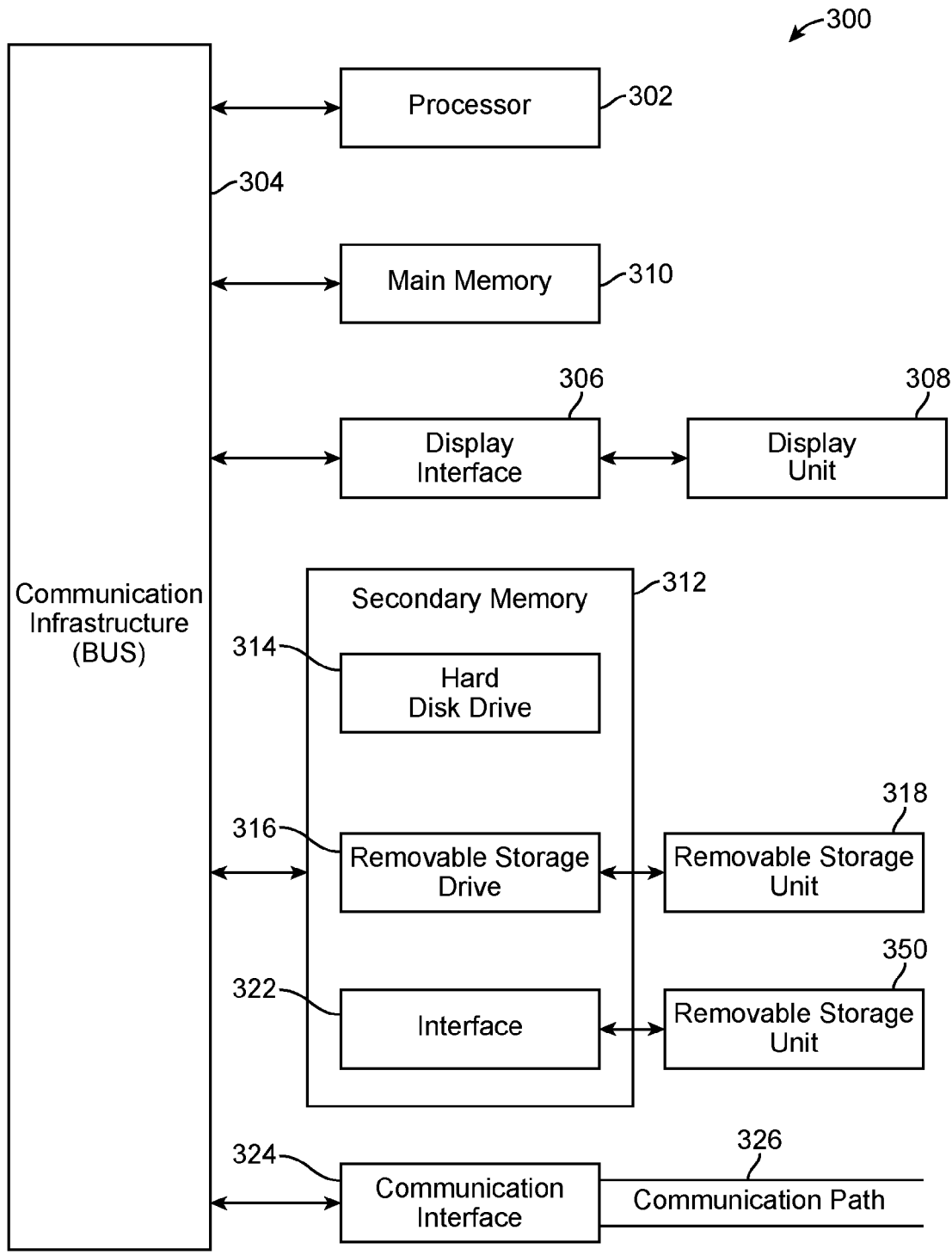
FIG. 13 is a high level block diagram showing an information processing system 300 useful for implementing one embodiment of the present invention.

FIG. 13 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 350 and an interface 322. Examples of such means may include a program package and package interface (such as that found in video game devices), a removable memory chip (such as an EPROM, or PROM) and associated socket, and other removable storage units 350 and interfaces 322 which allow software and data to be transferred from the removable storage unit 350 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for packet distribution in a virtual networking system comprising at least a first virtual network and a second virtual network, the method comprising:
   at a first virtual switch for the first virtual network:
      maintaining information mapping each virtual switch of the virtual networking system to a corresponding virtual network identifier (VNID) for a virtual network that includes the virtual switch;
      receiving, from a virtual machine of the first virtual network, an outgoing packet targeting a different virtual machine of the second virtual network; and
      based on the information maintained, tagging the outgoing packet with a first extended virtual networking tag comprising a VNID for the second virtual network, wherein the outgoing packet is encapsulated with an overlay header based on the first extended virtual networking tag before the outgoing packet is distributed to the second virtual network.

2. The method of claim 1, further comprising:
   at the first virtual switch for the first virtual network:
      receiving, via an underlying layer network interconnecting the first virtual network and the second virtual network, an incoming packet tagged with a second extended virtual networking tag comprising a VNID for the first virtual network; and
      forwarding the incoming packet to a target virtual machine of the first virtual network based on the second extended virtual networking tag.

3. The method of claim 2, wherein each extended virtual networking tag comprises an extended 802.1Q virtual local area network (VLAN) tag including a 24-bit VNID.

4. The method of claim 3, wherein each virtual switch of the virtual networking system supports address independence between different virtual networks of the virtual networking system.

5. The method of claim 4, wherein different virtual machines, of different virtual networks of the virtual networking system, have the same Internet Protocol (IP) address and media access control (MAC) address.

6. The method of claim 4, wherein different virtual machines, of the same virtual network of the virtual networking system, are deployed on different physical hosts located in different physical subnets.

7. The method of claim 4, wherein different virtual machines, of different virtual networks of the virtual networking system, are deployed on the same physical host.

8. The method of claim 3, wherein a network address for a virtual machine of the virtual networking system remains the same if the virtual machine is migrated from one virtual network of the virtual networking system to another virtual network of the virtual networking system.

9. A system for packet distribution in a virtual networking system comprising at least a first virtual network and a second virtual network, comprising:
at least one processor; and
a non-transitory processor-readable memory device storing instructions that when executed by the at least one processor causes the at least one processor to perform operations including:
at a first virtual switch for the first virtual network:
maintaining information mapping each virtual switch of the virtual networking system to a corresponding virtual network identifier (VNID) for a virtual network that includes the virtual switch;
receiving, from a virtual machine of the first virtual network, an outgoing packet targeting a different virtual machine of the second virtual network; and
based on the information maintained, tagging the outgoing packet with a first extended virtual networking tag comprising a VNID for the second virtual network, wherein the outgoing packet is encapsulated with an overlay header based on the first extended virtual networking tag before the outgoing packet is distributed to the second virtual network.

10. The system of claim 9, further comprising:
at the first virtual switch for the first virtual network:
receiving, via an underlying layer network interconnecting the first virtual network and the second virtual network, an incoming packet tagged with a second extended virtual networking tag comprising a VNID for the first virtual network; and
forwarding the incoming packet to a target virtual machine of the first virtual network based on the second extended virtual networking tag.

11. The system of claim 10, wherein each extended virtual networking tag comprises an extended 802.1Q virtual local area network (VLAN) tag including a 24-bit VNID.

12. The system of claim 11, wherein each virtual switch of the virtual networking system supports address independence between different virtual networks of the virtual networking system.

13. The system of claim 12, wherein different virtual machines, of different virtual networks of the virtual networking system, have the same Internet Protocol (IP) address and media access control (MAC) address.

14. The system of claim 12, wherein different virtual machines, of the same virtual network of the virtual networking system, are deployed on different physical hosts located in different physical subnets.

15. The system of claim 12, wherein different virtual machines, of different virtual networks of the virtual networking system, are deployed on the same physical host.

16. The system of claim 11, wherein a network address for a virtual machine of the virtual networking system remains the same if the virtual machine is migrated from one virtual network of the virtual networking system to another virtual network of the virtual networking system.

17. A non-transitory computer-readable medium storing instructions that, when executed by at least one processor of a machine, cause the machine to perform operations for packet distribution in a virtual networking system comprising at least a first virtual network and a second virtual network, the operations comprising:
at a first virtual switch for the first virtual network:
maintaining information mapping each virtual switch of the virtual networking system to a corresponding virtual network identifier (VNID) for a virtual network that includes the virtual switch;
receiving, from a virtual machine of the first virtual network, an outgoing packet targeting a different virtual machine of the second virtual network; and
based on the information maintained, tagging the outgoing packet with a first extended virtual networking tag comprising a VNID for the second virtual network, wherein the outgoing packet is encapsulated with an overlay header based on the first extended virtual networking tag before the outgoing packet is distributed to the second virtual network.

18. The non-transitory computer-readable medium of claim 17, wherein the operations further comprise:
at the first virtual switch for the first virtual network:
receiving, via an underlying layer network interconnecting the first virtual network and the second virtual network, an incoming packet tagged with a second extended virtual networking tag comprising a VNID for the first virtual network; and
forwarding the incoming packet to a target virtual machine of the first virtual network based on the second extended virtual networking tag.

19. The non-transitory computer-readable medium of claim 18, wherein each extended virtual networking tag comprises an extended 802.1Q virtual local area network (VLAN) tag including a 24-bit VNID.

20. The non-transitory computer-readable medium of claim 19, wherein:
each virtual switch of the virtual networking system supports address independence between different virtual networks of the virtual networking system; and
each virtual switch of the virtual networking system supports migration of a virtual machine of the virtual networking system without affecting a network address for the virtual machine.

* * * * *